United States Patent
Ichihara

(10) Patent No.: US 9,228,513 B2
(45) Date of Patent: Jan. 5, 2016

(54) EGR CONTROLLER FOR INTERNAL COMBUSTION ENGINE

(71) Applicant: DENSO CORPORATION, Kariya, Aichi-pref. (JP)

(72) Inventor: Hideaki Ichihara, Obu (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/299,476

(22) Filed: Jun. 9, 2014

(65) Prior Publication Data
US 2014/0366850 A1    Dec. 18, 2014

(30) Foreign Application Priority Data
Jun. 12, 2013    (JP) .................................. 2013-123430

(51) Int. Cl.
F02B 33/44    (2006.01)
F02D 41/00    (2006.01)
F02M 25/07    (2006.01)
F02D 13/02    (2006.01)

(52) U.S. Cl.
CPC ......... *F02D 41/0077* (2013.01); *F02D 13/0261* (2013.01); *F02M 25/0707* (2013.01); *F02M 25/0746* (2013.01); *F02D 2041/001* (2013.01); *F02M 25/0788* (2013.01)

(58) Field of Classification Search
CPC .......... F02D 13/0261; F02D 2041/001; F02D 41/0077; F02M 25/0707; F02M 25/0746; F02M 25/0788

See application file for complete search history.

(56) References Cited

U.S. PATENT DOCUMENTS

| | | | |
|---|---|---|---|
| 2003/0213454 A1* | 11/2003 | Grieser et al. | 123/179.18 |
| 2005/0268871 A1* | 12/2005 | Hirowatari et al. | 123/90.15 |
| 2011/0072792 A1* | 3/2011 | Bidner et al. | 60/278 |
| 2011/0137504 A1* | 6/2011 | Nakamura et al. | 701/22 |
| 2013/0311068 A1* | 11/2013 | Rollinger et al. | 701/104 |

FOREIGN PATENT DOCUMENTS

JP    3494831    11/2003

OTHER PUBLICATIONS

Ichihara, U.S. Appl. No. 14/299,519, filed Jun. 9, 2014.

* cited by examiner

*Primary Examiner* — Jesse Bogue
(74) *Attorney, Agent, or Firm* — Nixon & Vanderhye P.C.

(57) ABSTRACT

When the engine is in a specified operation state in which the EGR valve is brought into the full-close condition, the holding force for holding the EGR valve at the full-close position is corrected by correcting the control duty signal of the EGR valve. The control duty signal is corrected according to the target valve overlap quantity or the target phase of the valve timing. Thus, even when a proper holding force of the EGR valve is varied due to a variation in differential pressure between the intake pressure and the exhaust pressure, the holding force of the EGR valve is corrected to be a proper holding force.

5 Claims, 4 Drawing Sheets

EGR CONTROLLER FOR INTERNAL COMBUSTION ENGINE

CROSS-REFERENCE TO RELATED APPLICATION

This application is based on Japanese Patent Application No. 2013-123430 filed on Jun. 12, 2013, the disclosure of which is incorporated herein by reference.

TECHNICAL FIELD

The present disclosure relates to an EGR controller for an internal combustion engine provided with an EGR valve. The EGR valve adjusts a quantity of recirculated exhaust gas flowing into a cylinder. The EGR controller controls an opening degree of the EGR valve.

BACKGROUND

In an engine control system having an EGR valve, it is likely that an opening degree of the EGR valve may vary due to a differential pressure between an exhaust pressure and an intake pressure. Japanese patent No. 3494831 shows an engine control system in which a holding force for holding an opening degree of the EGR valve is established according to a differential pressure between an exhaust pressure and an intake pressure.

In an engine control system having a supercharger, when an internal combustion engine is at a low-rotation high-load operation state, the intake pressure exceeds the exhaust pressure for a certain time period in an exhaust stroke and an intake stroke. At this engine operation state, a valve overlap quantity between an intake valve and an exhaust valve is increased to increase the differential pressure between the intake pressure and the exhaust pressure, whereby a scavenging of cylinders is expedited. In this case, since the differential pressure is further increased, it is likely that a holding force for holding the EGR valve at full-close position may become insufficient, so that the EGR valve may be opened even if the controller commands the EGR valve to be closed. As a result, a fresh intake air may flow into an exhaust passage through the EGR valve, which deteriorates a supercharging performance of the turbocharger.

In view of Japanese patent No. 3494831, it is conceivable that the holding force for holding the EGR valve at full-close position is established according to a differential pressure between the intake pressure and the exhaust pressure. However, in this case, since the holding force is established after actually detecting the differential pressure between the intake pressure and the exhaust pressure, an increase of the holding force may delay relative to an increase of the differential pressure, so that the EGR valve may not be held at the full-close position.

SUMMARY

It is an object of the present disclosure to provide an exhaust gas recirculation (EGR) controller for an internal combustion engine, which is able to surely full-close an EGR valve when it is required.

According to the present disclosure, an EGR controller is applied to an internal combustion engine which is equipped with an EGR valve adjusting a quantity of an exhaust gas recirculating into an intake passage, a supercharger supercharging an intake air into the internal combustion engine, and a variable valve timing mechanism varying a valve timing of at least one of an intake valve and an exhaust valve of the internal combustion engine.

The EGR controller has a holding force correcting portion correcting a holding force for holding the EGR valve at a full-close position according to a target valve overlap quantity between an intake valve and an exhaust valve or an information having a correlation with the target valve overlap quantity, when an operational state of the internal combustion engine is a specified operational state in which the EGR valve is brought into a full-close position.

In the engine control system having the turbocharger, a supercharging performance varies according to an actual valve overlap quantity. Also, the differential pressure between the intake pressure and the exhaust pressure varies, whereby the holding force for holding the EGR valve at the full-close position also varies.

In view of the above characteristics, the control duty signal for the EGR valve is corrected according to a target valve overlap quantity or the information correlating with the target valve overlap quantity, so that the holding force for holding the EGR valve at the full-close position is corrected. Thus, even when a required holding force of the EGR valve is varied due to a variation in differential pressure between the intake pressure and the exhaust pressure, the holding force of the EGR valve can be corrected to a proper holding force. Furthermore, the holding force of the EGR valve is corrected according to the target valve overlap quantity.

Therefore, the holding force of the EGR valve can be controlled without any delay relative to a variation in differential pressure between the intake pressure and the exhaust pressure. The EGR valve can be surely brought into the full-close position. It can be avoided that the intake air flows into the exhaust passage through the EGR valve to deteriorate the supercharging performance.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
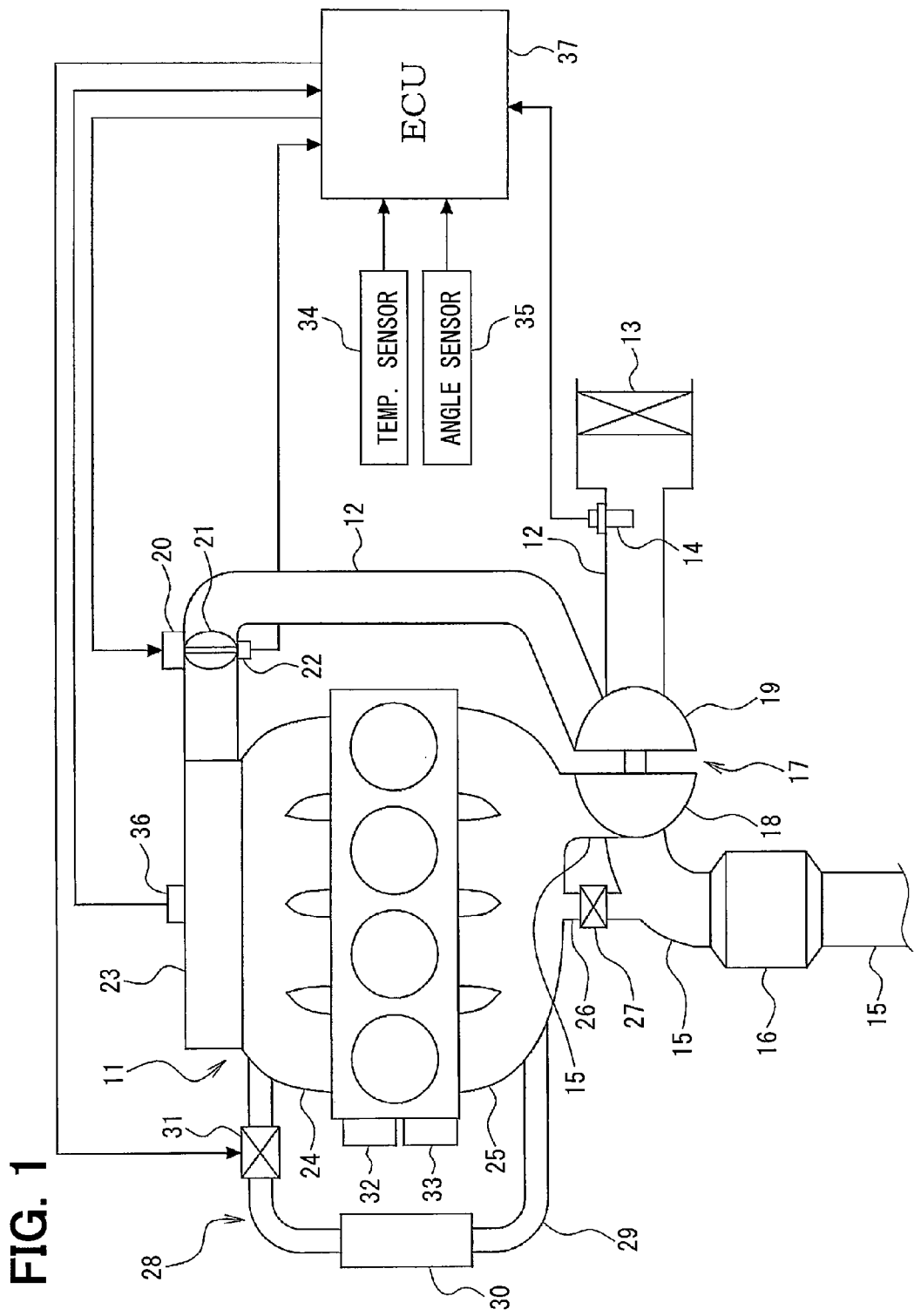
FIG. 1 is a schematic view of an engine control system according to an embodiment.

An embodiment will be described hereinafter. First, referring to FIG. 1, an engine control system is schematically explained. An air cleaner 13 is arranged upstream of an intake pipe 12 (intake passage) of an internal combustion engine 11. An airflow meter 14 detecting an intake air flow rate is provided downstream of the air cleaner 13. An exhaust pipe 15 (exhaust passage) of the engine 11 is provided with a three-way catalyst 16 which reduces CO, HC, NOx, and the like contained in exhaust gas.

The engine 11 is provided with a turbocharger 17. The turbocharger 17 includes an exhaust gas turbine 18 arranged upstream of the catalyst 16 in the exhaust pipe 15 and a compressor 19 arranged downstream of the airflow meter 14 in the intake pipe 12. This turbocharger 17 has well known configuration which supercharges the intake air into the combustion chamber.

A throttle valve 21 driven by a DC-motor 20 and a throttle position sensor 22 detecting a throttle position (throttle opening degree) are provided downstream of the compressor 19.

An intercooler (not shown) and a surge tank 23 is provided downstream of the throttle valve 21. The intercooler may be arranged upstream of the surge tank 23 and the throttle valve 21. An intake manifold 24 (intake passage) which introduces air into each cylinder of the engine 11 is provided downstream of the surge tank 23, and a fuel injector (not shown) which injects fuel is provided for each cylinder. A spark plug (not shown) is mounted on a cylinder head of the engine 11 corresponding to each cylinder to ignite air-fuel mixture in each cylinder.

An exhaust manifold 25 (exhaust passage) is connected to each exhaust port of the cylinder. A confluent portion of the exhaust manifold 25 is connected to the exhaust pipe 15 upstream of the exhaust gas turbine 18. An exhaust bypass passage 26 bypassing the exhaust gas turbine 18 is connected to the exhaust pipe 15. A waste gate valve 27 is disposed in the exhaust bypass passage 26 to open/close the exhaust bypass passage 26.

The engine 11 is provided with an EGR apparatus 28 which recirculates a part of exhaust gas flowing through an exhaust passage (exhaust manifold 25 or exhaust pipe 15) upstream of the catalyst 16 into an intake passage (surge tank 23 or intake manifold 24) downstream of the throttle valve 21. Such EGR apparatus 28 is referred to as High Pressure Loop (HPL) EGR apparatus. The EGR apparatus 28 has an EGR pipe 29 connecting the exhaust passage upstream of the exhaust gas turbine 18 and the intake passage downstream of the throttle valve 21. An EGR cooler 30 for cooling the EGR gas and an EGR valve 31 for adjusting an exhaust gas recirculation quantity (EGR gas quantity) are provided in the EGR pipe 29. An opening degree of the EGR valve 31 is adjusted by a motor (not shown).

The engine 11 is provided an intake-side variable valve timing controller 32 which adjusts a valve timing of an intake valve (not shown), and an exhaust-side variable valve timing controller 33 which adjusts a valve timing of an exhaust valve (not shown).

Further, the engine 11 is provided with a coolant temperature sensor 34 detecting coolant temperature and a crank angle sensor 35 outputting a pulse signal every when the crank shaft (not shown) rotates a specified crank angle. Based on the output signal of the crank angle sensor 35, a crank angle and an engine speed are detected. An intake air pressure sensor 36 detecting intake air pressure is provided in the surge tank 23.

The outputs of the above sensors are transmitted to an electronic control unit (ECU) 37. The ECU 37 includes a microcomputer which executes an engine control program stored in a Read Only Memory (ROM) to control a fuel injection quantity, an ignition timing, a throttle position (intake air flow rate) and the like.

Figure 2:
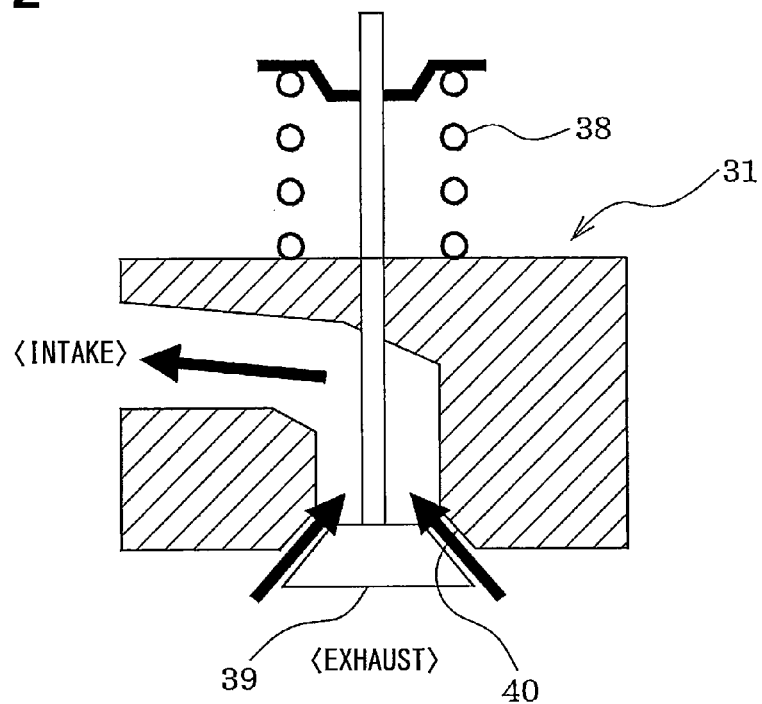
FIG. 2 is a schematic cross-sectional view showing an EGR valve.

As shown in FIG. 2, the EGR valve 31 is a poppet valve having a valve body 39 and a spring 38. The spring 38 biases the valve body 39 in a valve-closing direction. The motor (DC motor: not shown) drives the valve body 39 in a valve-opening direction against the biasing force of the spring 38. The ECU 37 generates a control duty signal based on which a driving current of the motor is controlled, whereby an opening degree of the EGR valve 31 is adjusted.

In a case that the control duty signal is a positive value, the motor is driven to close the valve body 39 of the EGR valve 31.

In a case that the control duty signal is a negative value, the motor is driven to open the valve body 39 of the EGR valve 31.

In a case that the control duty signal is zero, the driving current applied to the motor becomes zero. The spring 38 biases the valve body 39 in a valve-closing direction. That is, the spring 38 generates a holding force which brings the valve body 39 into a full-close position in which the valve body 39 is in contact with a valve seat 40.

Furthermore, when the control duty signal becomes a minus value, the motor drives the valve body 39 in the valve-closing direction, so that the holding force holding the EGR valve 31 in the full-close position is increased.

Besides, when the intake pressure is greater than the exhaust pressure, an inverse differential pressure (differential pressure between the intake pressure and the exhaust pressure) acts on the valve body 39 in the valve-opening direction.

Figure 4:
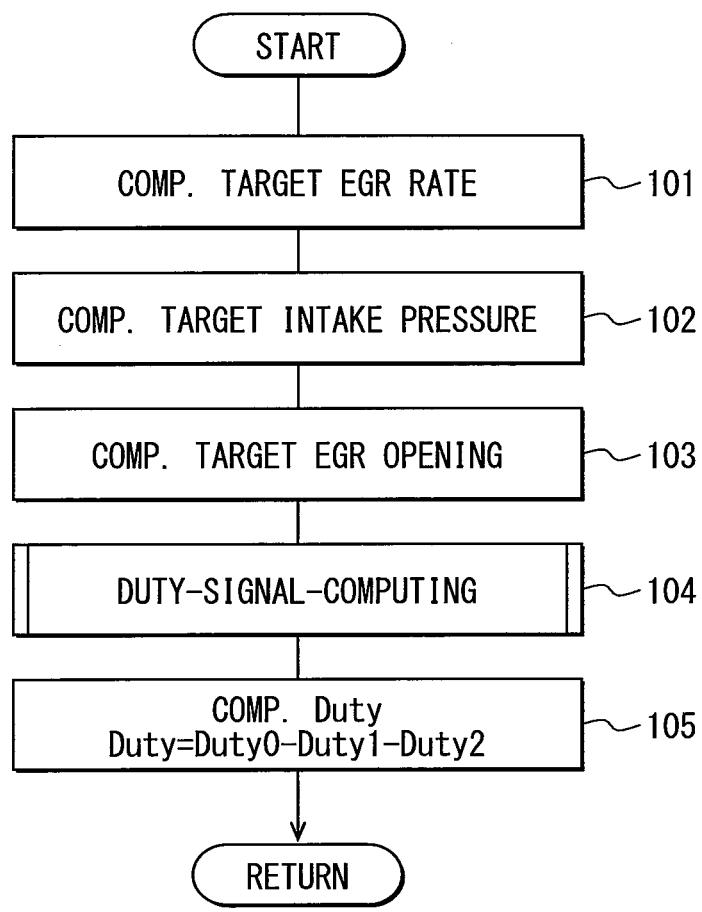
FIG. 4 is a flow chart showing a processing of an EGR control routine.
Figure 5:
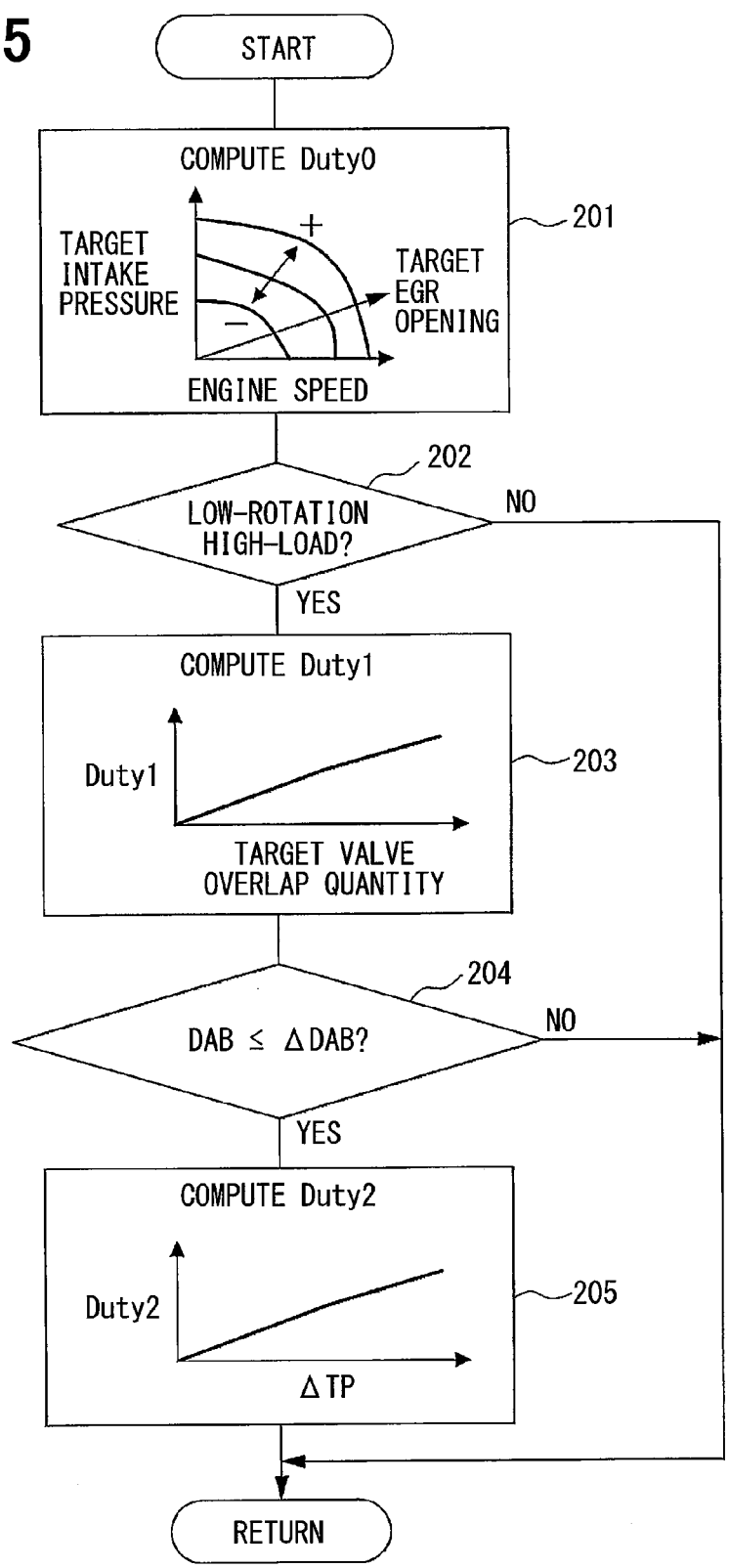
FIG. 5 is a flow chart showing a processing of a duty-signal-computing routine.

The ECU 37 executes each EGR control routine shown in FIGS. 4 and 5. The ECU 37 computes a target EGR rate based on an operational state of the engine 11. Then, based on the target EGR rate and the target intake airflow rate of the engine 11, the ECU 37 computes a target EGR opening. Further, based on the target EGR opening, the ECU 37 computes the control duty signal.

Figure 3:
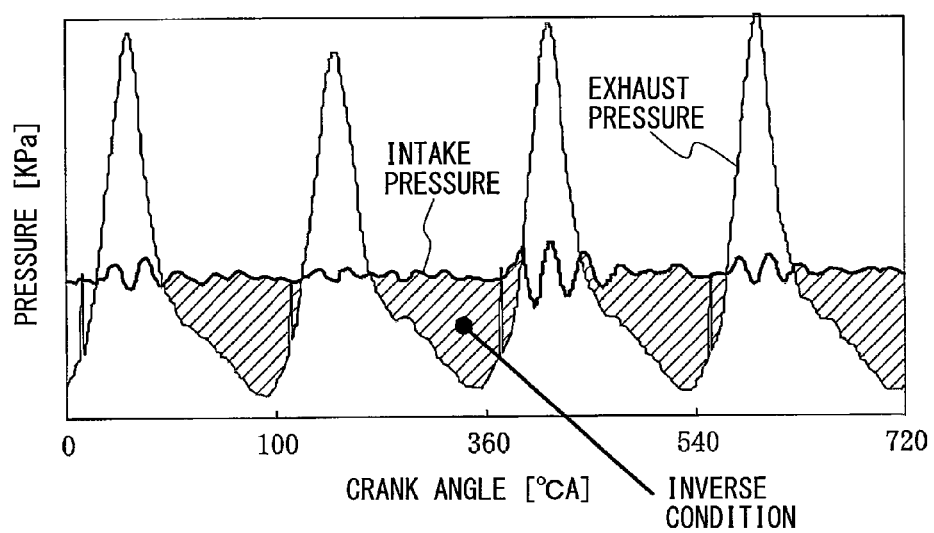
FIG. 3 is a time chart showing an intake pressure and an exhaust pressure.

As shown in FIG. 3, in an engine control system having a turbocharger 17, when an internal combustion engine 11 is in a low-rotation high-load operation state, the intake pressure exceeds the exhaust pressure for a certain time period in an exhaust stroke and an intake stroke. At this engine operation state, a valve overlap quantity between an intake valve and an exhaust valve is increased to increase the differential pressure between the intake pressure and the exhaust pressure, whereby a scavenging of cylinders is expedited. In this case, since the differential pressure is further increased, it is likely that a holding force for holding the EGR valve 31 at full-close position may become insufficient, so that the EGR valve 31 may be opened even if the controller commands the EGR valve 31 to be closed.

In order to avoid the above situation, according to the present embodiment, when the engine 11 is in a specified operation state in which the EGR valve 31 is brought into the full-close position, the control duty signal for the EGR valve 31 is corrected according to a target valve overlap quantity of an intake valve and an exhaust valve or information having correlation with the target valve overlap quantity. The holding force for holding the EGR valve 31 at full-close position is corrected.

In the engine control system having the turbocharger 17, a supercharging performance varies according to an actual valve overlap quantity. Also, the differential pressure between the intake pressure and the exhaust pressure varies, whereby the holding force for holding the EGR valve 31 at the full-close position also varies.

In view of the above characteristics, the control duty signal for the EGR valve 31 is corrected according to the target valve overlap quantity or the information correlating with the target valve overlap quantity, so that the holding force for holding the EGR valve 31 is corrected. Thus, even when a proper holding force of the EGR valve 31 is varied due to a variation in differential pressure between the intake pressure and the exhaust pressure, the holding force of the EGR valve 31 is corrected to be a proper holding force.

Referring to FIGS. 4 and 5, the processes of each EGR control routine will be described hereinafter.

The EGR control routine shown in FIG. 4 is repeatedly executed at specified intervals while the ECU 37 is ON (for example, while the ignition switch is on).

In step 101, the ECU 37 computes the target EGR rate based on an operational state of the engine 11, such as an engine speed and a target engine torque, in view of a map or a formula.

Then, in step 102, the ECU 37 computes a target intake pressure of the engine 11 based on the engine speed and the target intake airflow rate. The ECU 37 controls the waste gate valve 27 in order to achieve the target intake pressure.

In step 103, the ECU 37 computes a target EGR opening (target opening of the EGR valve 31) based on the target intake airflow rate and the target EGR rate in view of a map or a formula. Then, the procedure proceeds to step 104 in which a duty-signal-computing routine shown in FIG. 5 is executed to compute a basic duty signal Duty0 and a first and a second correction-duty signal Duty1 and Duty2.

In step 201 of the duty-signal-computing routine, the ECU 37 computes the basic duty signal Duty0 based on the target EGR opening, the engine speed and the target intake pressure in view of a map or a formula. When the target EGR opening is "0", that is, when the EGR valve 31 is fully closed, the basic duty signal Duty0 is set to "0" in view of the map or the formula. Alternatively, the basic duty signal Duty0 is set to a negative value.

Then, the procedure proceeds to step 202 in which the ECU 37 determines whether the current operational state of the engine 11 is a specified operational state in which the EGR valve 31 is brought into the full-close position. For example, the specified operational state corresponds to an operational state in which the engine speed is lower than 2000 rpm and the target intake pressure is higher than 140 kPa (low-rotation high-load operation state). If the holding force of the EGR valve 31 is not corrected in the low-rotation high-load operation state, it is likely that the holding force of the EGR valve 31 is insufficient. The EGR valve 31 may be opened.

When the answer is NO in step 202, the ECU 37 determines that the correction of the holding force is unnecessary. The first and the second correction-duty signal Duty1 and Duty2 are set to "0".

Meanwhile, when the answer is YES in step 202, the ECU 37 determines that the correction of the holding force is necessary. The procedure proceeds to step 203.

In step 203, the ECU 37 computes the first correction-duty signal Duty1 based on the target valve overlap quantity between the intake valve and the exhaust valve in view of a map or a formula. As the target valve overlap quantity becomes larger, the actual valve overlap quantity becomes larger. The differential pressure between the intake pressure and the exhaust pressure becomes large, and the holding force (proper holding force) necessary to hold the EGR valve 31 at full-close position becomes larger.

In view of the above characteristics, according to the map or the formula, the first correction-duty signal Duty1 is made larger as the target valve overlap quantity becomes larger. The holding force of the EGR valve 31 becomes larger. The map or the formula is previously formed based on experimental data and design data, and is stored in the ROM of the ECU 37.

Also, a target phase of an intake valve timing or an exhaust valve timing may be utilized as the target valve overlap quantity information. Since the valve overlap quantity varies according to the intake valve timing or the exhaust valve timing, the target phase of the intake valve timing or the exhaust valve timing has a correlation with the target valve overlap quantity.

In a system having an intake valve timing control mechanism 32 and an exhaust valve timing control mechanism 33, the first correction-duty signal Duty1 is computed based on a sum of the target phase of the intake valve timing and the target phase of the exhaust valve timing.

Also, in a system having the intake valve timing control mechanism 32 only, the first correction-duty signal Duty1 is computed based on the target phase (target retard amount) of the intake valve timing.

Also, in a system having the exhaust valve timing control mechanism 33 only, the first correction-duty signal Duty1 is computed based on the target phase (target advance amount) of the exhaust valve timing.

Then, the procedure proceeds to step 204 in which the ECU 37 determines whether an absolute value "DAB" of a difference between the target valve overlap quantity and the actual valve overlap quantity is less than or equal to a specified value ΔDAB, for example 2° CA. Based on this result, the ECU 37 determines whether the actual valve overlap quantity comes close to the target valve overlap quantity.

When the answer is NO in step 204, the procedure ends.

When the answer is YES in step 204, the procedure proceeds to step 205 in which the ECU 37 computes the second correction-duty signal Duty2 based on a difference ΔTP between the target intake pressure and the actual intake pressure in view of a map or a formula.

The second correction-duty signal Duty2 is made larger as the difference ΔTP between the target intake pressure and the actual intake pressure becomes larger. The holding force of the EGR valve 31 becomes larger. The map or the formula is previously formed based on experimental data and design data, and is stored in the ROM of the ECU 37.

After the basic duty signal Duty0, the first correction-duty signal Duty1 and the second correction-duty signal Duty2 are computed, the procedure proceeds to step 105 in which a final duty signal Duty is computed as follows:

$$Duty = Duty0 - Duty1 - Duty2$$

As described above, when the operational state of the engine 11 is the specified operational state (low-rotation high-load operation), the holding force of the EGR valve 31 is corrected by correcting the control duty signal of the EGR valve 31. The control duty signal is corrected according to the target valve overlap quantity and the difference ΔTP between the target intake pressure and the actual intake pressure. The processes in steps 104 and 105 correspond to a holding force correcting portion.

According to the present embodiment described above, when the operational state of the engine 11 is the specified operational state (low-rotation high-load operation), the holding force for holding the EGR valve 31 at the full-close position is corrected by correcting the control duty signal of the EGR valve 31. The control duty signal is corrected according to the target valve overlap quantity or the target phase of the valve timing. Thus, even when a required holding force of the EGR valve 31 is varied due to the variation in differential pressure between the intake pressure and the exhaust pressure, the holding force of the EGR valve 31 can be corrected to a proper holding force. Furthermore, the holding force of the EGR valve 31 is corrected according to the target valve overlap quantity.

Therefore, the holding force of the EGR valve 31 can be controlled without any delay relative to a variation in differential pressure between the intake pressure and the exhaust pressure. The EGR valve 3 can be surely brought into the full-close position. It can be avoided that the intake air flows into the exhaust passage through the EGR valve 31 to deteriorate the supercharging performance.

Further, according to the present embodiment, since the holding force of the EGR valve 31 is corrected by correcting the control duty signal of the EGR valve 31 according to the difference ΔTP between the target intake pressure and the actual intake pressure, the holding force of the EGR valve 31 can be corrected in view of an influence of the difference ΔTP between the target intake pressure and the actual intake pressure, so that the holding force of the EGR valve 31 can be surely set to the proper holding force. Thereby, it can be avoided that the intake air flows into the exhaust passage. A scavenging performance can be improved.

Moreover, according to the present embodiment, only when the engine operation state is the low-rotation high-load operation state, the holding force is corrected. Thus, it can be avoided that the holding force is corrected more than necessary.

The EGR valve 31 is not limited to a poppet valve. The EGR valve 31 may be a butterfly valve or other type valve.

The EGR apparatus 28 is not limited to the HPL type apparatus. The exhaust gas may be recirculated from downstream of the exhaust turbine in the exhaust pipe to downstream of the throttle valve in the intake pipe.

The present disclosure can be applied to an engine provided with a mechanical supercharger or an electrical supercharger.

What is claimed is:

1. An EGR controller for an internal combustion engine equipped with an EGR valve adjusting a quantity of an exhaust gas recirculating into an intake passage, a supercharger supercharging an intake air into the internal combustion engine, and a variable valve timing mechanism varying a valve timing of at least one of an intake valve and an exhaust valve of the internal combustion engine, the EGR controller comprising:
    a holding force correcting portion configured to correct a holding force for holding the EGR valve at a full-close position, according to a target open valve overlap quantity between an intake valve and an exhaust valve or an information having a correlation with the target open valve overlap quantity, when an operational state of the internal combustion engine is a specified operational state while the EGR valve is in a full-close position.

2. An EGR controller according to claim 1, wherein
    the information having the correlation with the target open valve overlap quantity includes a target phase of the valve timing.

3. An EGR controller according to claim 1, wherein
    the holding force correcting portion corrects the holding force according to a difference between a target intake pressure and an actual intake pressure.

4. An EGR controller according to claim 1, wherein
    the specified operational state is an operational state in which a rotation speed of the internal combustion engine is lower than a specified speed and a target intake pressure is higher than a specified pressure.

5. An EGR controller according to claim 1, wherein
    the holding force correcting portion is configured to increase the holding force while the EGR valve is in the full-close position.

* * * * *